United States Patent [19]
Kilbane, Jr.

[11] 3,883,190
[45] May 13, 1975

[54] SNOWMOBILE TRACTION CLEAT AND DRIVE BELT

[76] Inventor: James Anthony Kilbane, Jr., Rt. 1, Smithtown, Bay Rd., Excelsior, Minn. 55331

[22] Filed: Oct. 3, 1973

[21] Appl. No.: 403,014

[52] U.S. Cl. ............................. 305/35 EB; 305/54
[51] Int. Cl. ........................................... B62d 55/28
[58] Field of Search.......... 305/35 R, 35 EB, 36, 37, 305/38, 51, 54, 55, 56; 301/43, 44 R

[56] References Cited
UNITED STATES PATENTS

| | | | |
|---|---|---|---|
| 2,330,195 | 9/1943 | Allen | 305/35 EB |
| 3,165,364 | 1/1965 | Hardman | 305/35 EB |
| 3,572,851 | 3/1971 | Schuler | 305/54 |
| 3,680,925 | 8/1972 | Spivy | 305/56 |
| 3,738,714 | 6/1973 | Ness | 305/35 EB |
| 3,782,787 | 1/1974 | Rubel | 305/35 EB |

*Primary Examiner*—Philip Goodman
*Assistant Examiner*—John A. Carroll
*Attorney, Agent, or Firm*—Gary L. Griswold

[57] ABSTRACT

A traction cleat for a snowmobile comprising a first channel-shaped structure with a second member held within said structure, the second member comprising a base with at least one projection extending from its upper surface and extending beyond the first channel-shaped structure, the second member being held within the first channel-shaped structure by securing means and top means; and a traction drive belt with such cleats attached thereto.

17 Claims, 9 Drawing Figures

PATENTED MAY 13 1975　　　3,883,190

SNOWMOBILE TRACTION CLEAT AND DRIVE BELT

This invention relates to a traction cleat and drive belt for a snowmobile. Particularly, this invention relates to a traction cleat comprising a first channel-shaped structure with a top means and a replaceable second member with projections attached thereto held within said first channel-shaped structure and a drive belt with such cleats attached.

Traction cleats for snowmobiles are well known. Many variations have been utilized. The most common snowmobile traction cleat is a cleat which is merely a channel (U.S. Pat. No. 3,485,312). A variation of the above snowmobile traction cleat is that shown in U.S. Pat. No. 3,572,851. In this variation, the channel of the traction cleat contains removable studs which are utilized for obtaining better traction in ice and snow. Other snowmobile cleats are also known and include those wherein the legs of the channel have an undulating configuration and those wherein the legs of the channels have extensions extending from the upper edges of the legs.

The above cleats, except for the ones with the added studs are all one-piece cleats and in order to replace the ground contacting portion of the cleat, one has to replace the entire cleat. This is a tedious task involving the removing and replacing of a multiplicity of rivets. The cleat with the added studs has the same defect for the studs are riveted to the cleat by rivets which also hold the cleats on the drive belt of the snowmobile. Normally, a number of these studs are attached to each cleat. Thus, a great deal of riveting is involved in installing or replacing the studs.

The problems involved in replacing the working portion of the cleats made it difficult for one to adapt his snowmobile traction system to varying conditions of snow and ice, the materials normally traversed by a snowmobile. Thus, in racing, one could not rapidly change cleats to compensate for a changing track, i.e., a track changing from snow to packed snow to ice. Different cleat configurations, of course, perform better on different track surfaces. Therefore, a cleat was needed which would allow one to replace the working portion thereof rapidly for changing snow and ice conditions but which would be secure and strong when in use.

Such a cleat has been found. It comprises:

a. a first channel-shaped structure comprising a base, a pair of legs attached to and extending outwardly from said base on oppositely disposed longitudinal margins of said base and a top means attached to said legs at the ends of said legs opposite to those attached to said base for holding a second member in said first channel-shaped structure and for allowing projections of the second member to project beyond said first channel-shaped structure.

b. a second member comprising a base having at least one projection extending from the upper surface of said base, said second member being held within said first channel-shaped structure and slidably removable therefrom with said projection of said second member extending through said top means of said first channel-shaped structure and the upper surface of said base of said second member contacting said top means of said first channel-shaped structure, and c. securing means for holding said second member from any substantial movement in the longitudinal direction of said first channel-shaped structure. The invention also comprises a traction drive belt with a plurality of the above cleats attached thereto.

A detailed description of the invention will be made with reference to the Figures in which.

Figure 1:
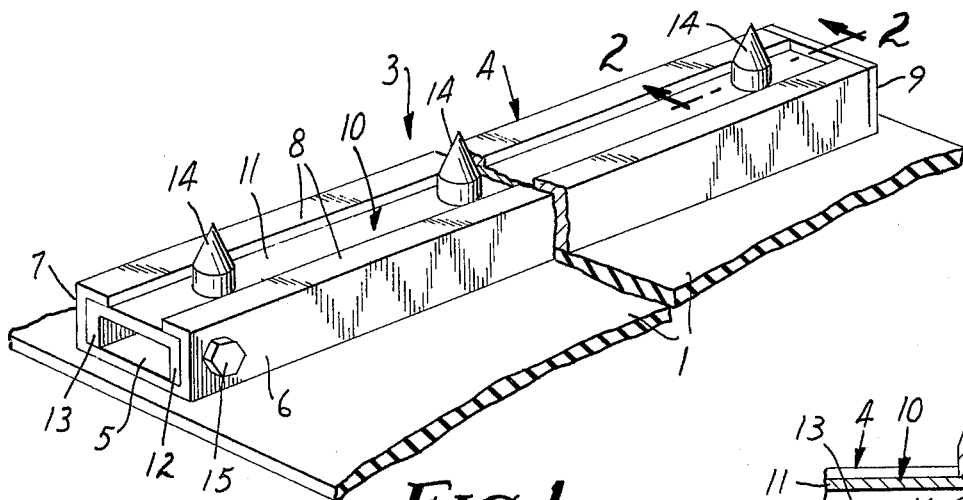
FIG. 1 is a perspective view of an embodiment of the cleat attached to an endless drive belt of a snowmobile.

Referring to the Figures in detail, the traction drive belt 1 has attached to it by means of rivet 2 cleat 3 which comprises a first channel-shaped structure 4 comprising planar base 5, legs 6 and 7 extending from the longitudinal margins of the base 5 and top means 8. At the end of first channel-shaped structure 4 is end plate 9 for holding second member 10 comprising planar base 11 and legs 12 and 13 extending from the longitudinal margins of the base 11 with projections 14 extending from base 11. When the snowmobile is being operated, these projections 14 penetrate the snow or ice over which the snowmobile is moving and provide traction for the snowmobile. The second member 10 is held against end plate 9 by means of bolt 15. These securing means prevent the second member 10 from moving in the longitudinal direction of the first channel-shaped structure 4 which is the transverse dimension of the traction drive belt 1. The securing means must be capable of withstanding a large force for such a force is applied to it when for instance the snowmobile is cornering at high speeds. Bolt 15 is, of course, easily removable and allows for rapid removal and replacement of second member 10 in first channel-shaped structure 4. The bolt can be a rivet or a clip for fitting over the end of the first channel, or other means of preventing longitudinal movement of the second member in the first channel-shaped structure. A bolt, rivet, clip or other means for preventing longitudinal movement of the second member can be used rather than the end plate 9, although the latter is preferred.

Figure 2:
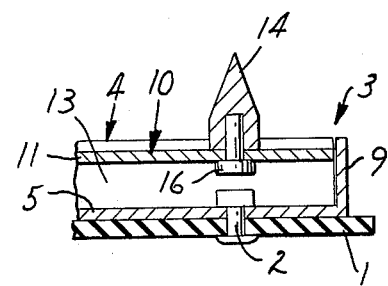
FIG. 2 is a section view of a portion of the drive belt and traction cleat of FIG. 1, taken along line 2—2.

FIG. 2 shows in detail, by means of a section view along line 2—2 of FIG. 1, the end portion of the cleat depicted in FIG. 1. In this embodiment, the first channel-shaped structure 4 is attached to traction drive belt 1 by means of rivet 2. Projection 14 is attached to the base 11 of the second member 10 by means of the pressure-fit rivet 16. The end plate 9 as shown is integral with planar base 5 of the first channel-shaped structure 4. The end plate 9 can be attached by forming, molding, welding, brazing or by other means.

Figure 3:
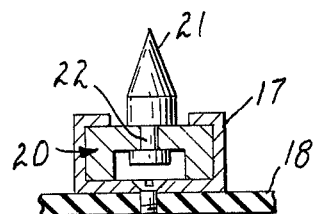
FIG. 3 is a transverse section view depicting another embodiment of the traction cleat and drive belt.

FIG. 3 is a section view of another embodiment of the traction cleat. In this case, the first channel-shaped structure 17 is held in place on the drive belt 18 by means of recessed bolt 19, thus allowing space for a thicker second member 20 with projection 21 held by rivet 22.

Figure 4:
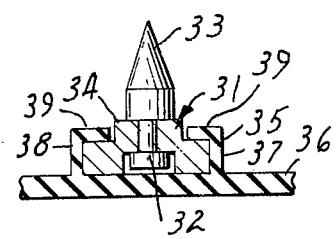
FIG. 4 is a transverse section view depicting another embodiment of the traction cleat and drive belt.

FIG. 4 is a section view of another embodiment of the invention showing the first channel-shaped structure 25 molded into the traction drive belt 26. In this case, the second member 23 has a solid and rectangular-shaped base 45 with projection 24 welded thereto.

Figures 5, 9:
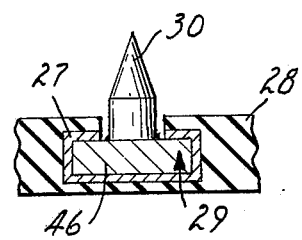
FIG. 5 is a transverse section view depicting another embodiment of the traction cleat and drive belt.
FIG. 9 is a perspective view of another embodiment of the projections extending from the traction cleat.

FIG. 5 is a section view of another embodiment wherein the first channel-shaped structure 27 is molded into the traction drive belt 28 and the second member 29 has a solid and rectangular-shaped base 46 with projection 30 welded thereto.

Figure 6:
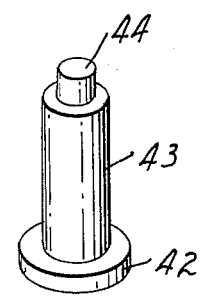
FIG. 6 is a transverse section view depicting another embodiment of the traction cleat and drive belt.

FIG. 6 depicts a traction cleat wherein the second member 31 has a hat-shaped configuration with rivet 32 holding projection 33 to the base 34 of second member 31. The first channel-shaped structure 35 is integral with the belt 36, i.e., is molded as a part of the belt and is made of rubber or plastic or polymeric material. Thus, legs 37 and 38 and top means 39 are integral with each other and with the belt 36.

Figure 7:
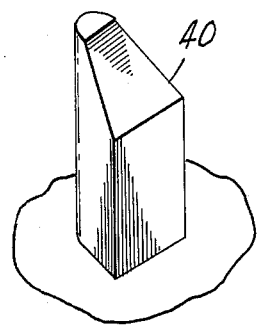
FIG. 7 is a perspective view of another embodiment of the projections extending from the traction cleat.
Figure 8:
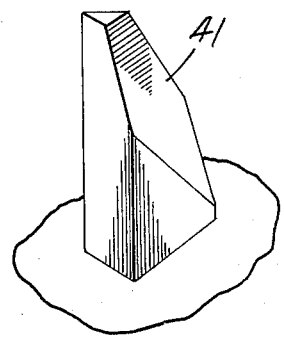
FIG. 8 is a perspective view of another embodiment of the projections extending from the traction cleat.

FIG. 7 is a perspective of another type of projection 40, in this case, one with a shaved edge. FIG. 8 is another embodiment of a projection 41 with a shaved edge with a different configuration. FIG. 9 depicts another embodiment of the projection which contains base 42, shaft 43 and tip 44. All of these embodiments can be used to replace the projections shown in FIGS. 1 through 6. Other types, of course, can also be used. Projection 14 of FIG. 1 as well as the embodiment shown in FIG. 9 has the advantage of being nondirectional in that they are uniform around their circumference, i.e., in all directions. Thus, they provide traction uniformly in all directions.

The projections can be attached to the base of the second member by any means such as by riveting, spot welding, furnace brazing, threading, molding and press-fitting, that is, holding by friction. The projections can be made of hard plastic or rubber, or metal such as steel, hardened steel being preferred, and by molding, forming, etc.

The second member other than the projections can be a flat rectangular-shaped structure, a channel-shaped structure, a hat-shaped structure or other configuration. The second member can be hard plastic or rubber or metal such as steel or aluminum. Metal, particularly steel, is preferred. The second member other than the projections can be made by forming, molding, etc.

The first channel-shaped structure can be plastic or rubber and be molded as part of the traction drive belt which is normally rubber or plastic and be integral with it or can be plastic, rubber or metal, such as steel, aluminum, copper or brass, steel and aluminum being preferred, and affixed to the belt by means of bolts, rivets or other means or can be molded within the belt. Depending on the suspension system of the snowmobile, i.e., whether it is the slide rail or bogie wheel type, it may be required that the first channel-shaped structure be steel and that portions of such be exposed, i.e., not covered by rubber or plastic. The first channel-shaped structure can be made by molding, forming, etc. The securing means can be any of the materials noted above, but is preferably metal and in particular, steel.

I claim:

1. A traction cleat for a snowmobile comprising:

a. a first channel-shaped structure comprising a base, a pair of legs attached to and extending outwardly from said base on oppositely disposed longitudinal margins of said base and a top means attached to said legs at the ends of said legs opposite to those attached to said base for holding a second member in said first channel-shaped structure and for allowing projections of the second member to project beyond said first channel-shaped structure, b. a second member comprising a base having at least one projection extending from the upper surface of said base, said second member being held within said first channel-shaped structure, and slidably removable therefrom with said projection of said second member extending through said top means of said first channel-shaped structure and the upper surface of said base of said second member contacting said top means of said first channel-shaped structure, and c. securing means for holding said second member from any substantial movement in the longitudinal direction of said first channel-shaped structure.

2. The traction cleat of claim 1 wherein said planar base of said second member has a plurality of projections extending from its upper surface.

3. The cleat of claim 2 wherein said base of said second member has a pair of legs attached to and extending outwardly from said base on oppositely disposed longitudinal margins of such base, said legs extending from the surface of said base opposite to that contacting said top means of said first channel.

4. The cleat of claim 2 wherein said second member is a rectangular-shaped solid structure with said projections attached thereto.

5. The cleat of claim 1 wherein said securing means comprises an end plate attached to one end of said first channel-shaped structure and means for holding said second member against said end plate and for allowing for removal of said second member from said first channel-shaped structure.

6. A traction drive belt comprising a belt with a plurality of the traction cleats of claim 1 attached thereto, said cleats being spaced along the longitudinal dimension of said belt with the longitudinal margin of said base of said first channel-shaped structure corresponding to the transverse dimension of said belt.

7. A traction drive belt comprising a belt with a plurality of the traction cleats of claim 3 attached thereto, said cleats being spaced along the longitudinal dimension of said belt with the longitudinal margin of said base of said first channel-shaped structure corresponding to the transverse dimension of said belt.

8. A traction drive belt comprising a belt with a plurality of the traction cleats of claim 4 attached thereto, said cleats being spaced along the longitudinal dimension of said belt with the longitudinal margin of said base of said first channel-shaped structure corresponding to the transverse dimension of said belt.

9. A traction drive belt comprising a belt with a plurality of the traction cleats of claim 5 attached thereto, said cleats being spaced along the longitudinal dimension of said belt with the longitudinal margin of said base of said first channel-shaped structure corresponding to the transverse dimension of said belt.

10. The traction drive belt of claim 6 wherein said first channel-shaped structures of said traction cleats are molded into said traction drive belt.

11. The traction drive belt of claim 10 wherein said first channel-shaped structures are integral with said belt.

12. The traction drive belt of claim 7 wherein said first channel-shaped structures of said traction cleats are molded into said traction drive belt.

13. The traction drive belt of claim 12 wherein said first channel-shaped structures are integral with said belt.

14. The traction drive belt of claim 8 wherein said first channel-shaped structure of said traction cleats are molded into said traction drive belt.

15. The traction drive belt of claim 14 wherein said first channel-shaped structures are integral with said belt.

16. The traction drive belt of claim 9 wherein said first channel-shaped structures of said traction cleats are molded into said traction drive belt.

17. The traction drive belt of claim 16 wherein said first channel-shaped structures and said end plates are integral with said belt.

* * * * *